United States Patent [19]

Mullally

[11] Patent Number: 4,570,904
[45] Date of Patent: Feb. 18, 1986

[54] SOLENOID VALVE

[75] Inventor: Charles J. Mullally, Muskegon, Mich.

[73] Assignee: Sealed Power Corporation, Muskegon, Mich.

[21] Appl. No.: 629,955

[22] Filed: Jul. 11, 1984

[51] Int. Cl.[4] ............................................. F16K 31/02
[52] U.S. Cl. .......................... 251/129.21; 251/129.01; 137/625.65; 137/625.48
[58] Field of Search ............... 251/141, 139, 321, 323, 251/322; 137/625.65, 625.5, DIG. 2, 625.48

[56] References Cited

U.S. PATENT DOCUMENTS

| | | | |
|---|---|---|---|
| 4,320,781 | 3/1982 | Bouvet | 251/141 |
| 4,390,130 | 6/1983 | Linssen | 251/139 |

FOREIGN PATENT DOCUMENTS

| | | | |
|---|---|---|---|
| 2337886 | 2/1975 | Fed. Rep. of Germany | 251/141 |

*Primary Examiner*—William E. Lyddane
*Assistant Examiner*—Gerald Anderson
*Attorney, Agent, or Firm*—Barnes, Kisselle, Raisch, Choate, Whittemore & Hulbert

[57] ABSTRACT

A pulse width modulated solenoid valve having a housing and includes a pole member including a pole piece extending axially inwardly of the housing, and a transverse wall extending radially outwardly into engagement with a peripheral wall. The pole piece has an axial opening therethrough and defines a first conical seat. The axial extension of the housing has an axial opening aligned with the opening of the pole. An insert is positioned in an axial opening in the axial extension and defines a second seat. A ball is interposed between the first and second seats and has limited movement between the seats. A spring yieldingly urges the ball into engagement with the second seat. A plurality of circumferentially spaced passages extend from adjacent the periphery of the ball through the axial extension of the housing at an acute angle to the axial opening in the axial extension to the periphery of the housing. The housing and pole member define an annular space and a coil assembly is positioned in the annular space, such that when fluid is applied to the axial opening in the insert and the coil is de-energized, the spring holds the ball against the second seat and prevents flow through the axial opening in the insert permitting communication about the ball and first seat through the axial opening in the pole and when the solenoid is energized, the ball is drawn toward the first seat to close communication to the axial opening in the pole and permit flow from the axial opening in the insert past the second seat and through the angular passages defined to the exterior of the axial extension.

6 Claims, 3 Drawing Figures

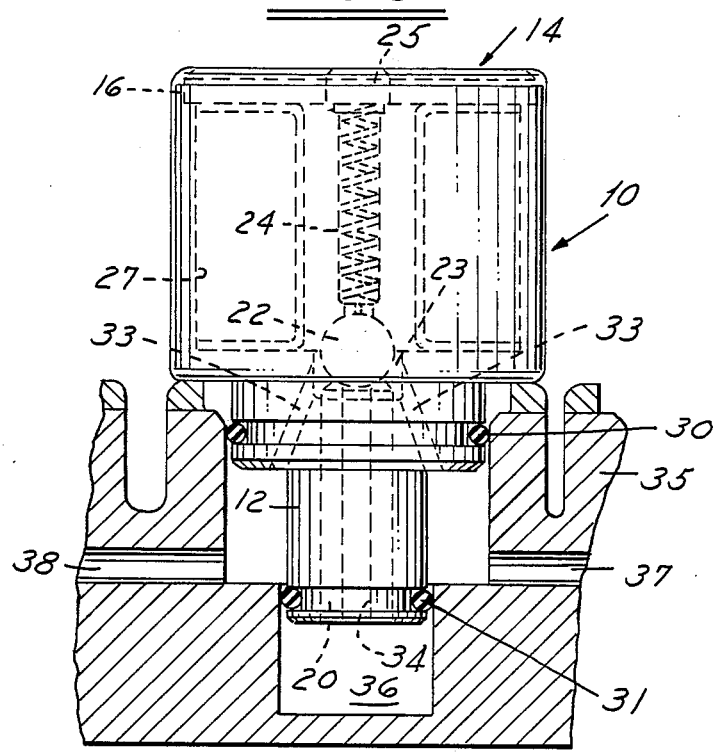

SOLENOID VALVE

This invention relates to solenoid valves such as are utilized in automatic transmissions.

BACKGROUND AND SUMMARY OF THE INVENTION

It has heretofore been suggested that the valves of a hydraulic transmission such as utilized in vehicles can be controlled by a microprocessor which includes sensors that sense variables such as road speed, throttle position and engine rpm and functions to provide pulses to pulse width modulated valves which in turn control spool valves for operating clutches in the transmission or controlling clutches directly.

In such pulse width modulator valves it is desirable to be able to accurately control the pressure of the fluid.

The space requirements are quite small and therefore require a small valve which will function effectively in a pulse width modulated mode or a steady state directional mode to provide the fluid at constant pressure.

Accordingly, among the objectives of the present invention are to provide a solenoid valve which is small, utilizes a minimum number of parts to produce the desired control of pressure and flow and can be used in a pulse width modulated mode or in a steady state directional mode.

In accordance with the invention, the pulse width modulated valve comprises a valve housing including a first transverse wall, an integral extension extending axially from the transverse wall and a peripheral wall extending axially from the periphery of the first transverse wall in a direction opposite to the direction in which the axial extension extends. The solenoid valve also includes a pole member including a pole piece extending axially inwardly of the housing, a second transverse wall extending radially outwardly into engagement with the peripheral wall. The pole piece has an axial opening therethrough and defines a first conical seat. The axial extension of the housing has an axial opening aligned with the opening of the pole. An insert is positioned in the axial opening in the axial extension and defines a second seat. A ball is interposed between the first and second seats and has limited movement between the seats. A spring means yieldingly urges the ball into engagement with the second seat. A plurality of circumferentially spaced passages extend from adjacent the periphery of the ball through the axial extension of the housing at an acute angle to the axial opening in the axial extension to the periphery of the housing. The housing and pole member define an annular space and a coil assembly is positioned in the annular space, such that when fluid is applied to the axial opening in the insert and the coil is de-energized, the spring means holds the ball against the second seat and prevents flow through the axial opening in the insert while permitting communication about the ball and first seat through the axial opening in the pole and when the solenoid is energized, the ball is drawn toward the first seat to close communication to the axial opening in the pole and permit flow from the axial opening in the insert past the second seat and through the angular passages to the exterior of the axial extension.

DESCRIPTION OF THE DRAWINGS

FIG. 3 is a part sectional view showing the use of the valve embodying the invention in a typical transmission manifold.

DESCRIPTION

Figure 1:
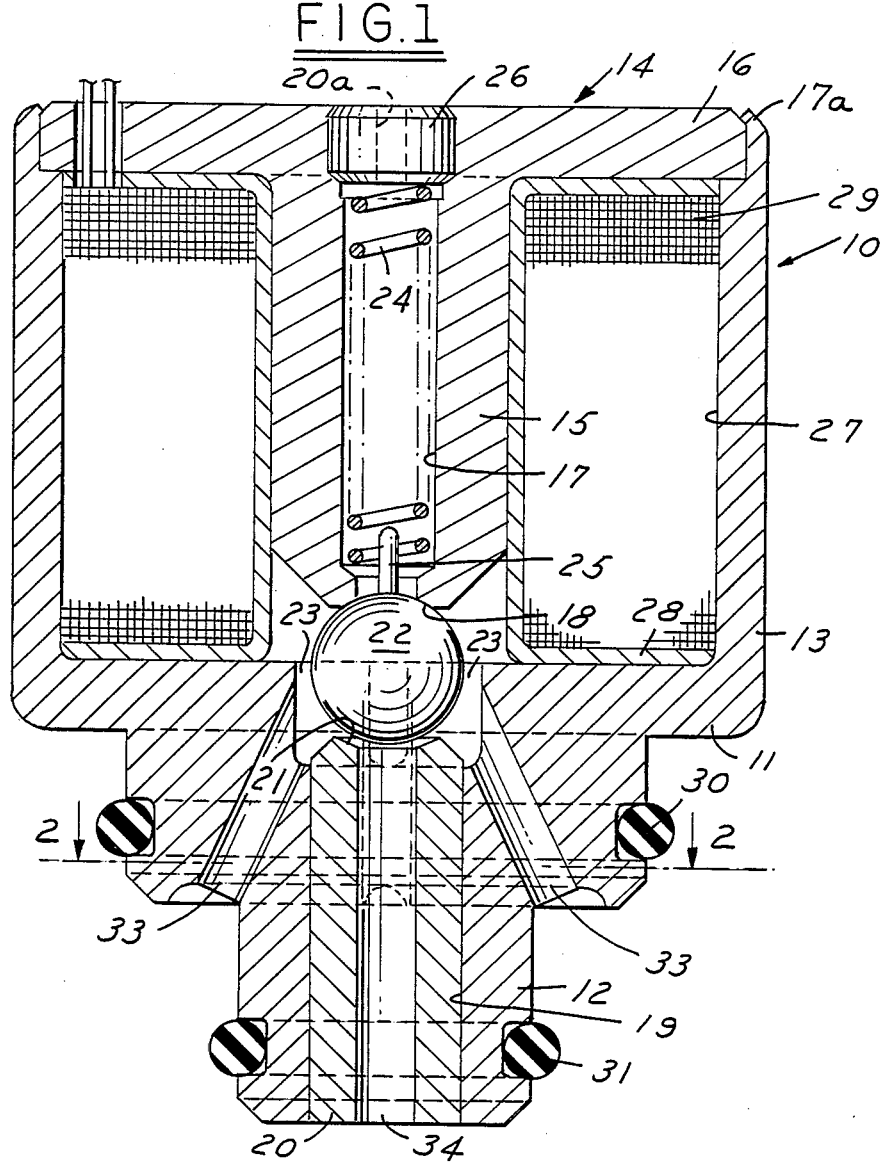
FIG. 1 is a vertical sectional view of a solenoid valve embodying the invention.
Figure 2:
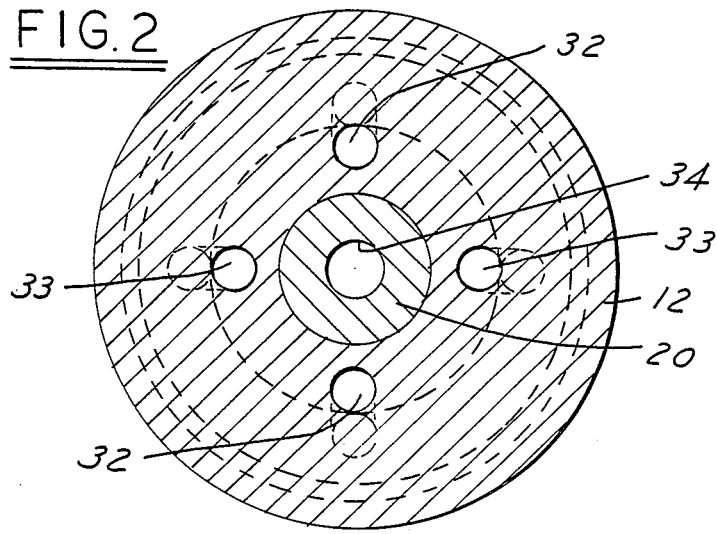
FIG. 2 is a fragmentary sectional view taken along the line 2—2 in FIG. 1.

The solenoid valve embodying the invention is preferably used in a pulse width modulated valve with a control system wherein a microprocessor receives signals from sensors that monitor functions such as road speed, throttle position and engine rpm and provides signals to the microprocessor which, in turn, controls solenoid valves which are modulated and function as pilot valves to control pilot operated spool valves or function as control valves acting directly on hydraulic components in the transmission such as a clutch. The solenoid valve may also be used without pulse width modulation as a steady state on-off type valve.

The solenoid valve embodying the invention comprises a housing 10 that includes a transverse wall 11 having an axial extension 12 and an integral peripheral wall 13. The valve further includes a pole member 14 having an axial pole 15 and a transverse wall 16 extending to the peripheral wall 13 and connected thereto and by bending the edge 17a of the wall 13 over the periphery of the wall 16. Alternatively transverse wall 16 would be connected to peripheral wall 13 by welding at edge 17a.

Pole 15 is provided with an axial opening 17 and a first conical valve seat 18 at its lower end. The end of pole 15 is tapered. The axial extension 12 is provided with an opening 19 into which an insert 20 is installed and secured in position by a suitable means such as press fit, welding or prinning. Opening 19 extends thru transverse wall 11. Insert 20 has an axial opening 34 and defines a second conical valve seat 21 at one end. A ball 22 is interposed between the seats 18, 21 and has limited movement. Axial grooves 23 in wall 11 and extension 12 adjacent seat 21 facilitate flow about the ball 22.

Spring means in the form of a compression spring 24 and a member 25 are interposed in the opening 17 between a press fitted and welded pin 26 apertured as at 20a and a narrow portion of the opening to yieldingly urge the ball toward the second seat 21.

The housing 10 and pole 15 defines an annular cavity 27 in which a coil assembly including a coil holder 28 and an annular coil 29 are positioned. As shown the major portion of the ball 22 lies within the transverse wall 11 of the housing.

In use, O-rings 30, 31 are provided about the extension 12 so that the valve can be inserted in the appropriate place in the device such as a transmission with which it is used.

A plurality of circumferentially spaced passages 33 are provided in housing 10 and extend from adjacent the periphery of the ball 22 through the axial extension of the housing at an acute angle to the axial inlet opening 34 in the axial extension to the periphery of the housing axially between O-rings 30, 31.

When the coil is de-energized, the spring 24 urges the ball 22 against the second seat 21 so there will be no flow from the inlet 34 through the passages 33. However, there will be free communication between the passages 33, grooves 23 about the ball 22 past first seat 18 and through the passage 17 and opening 20a to the exterior which is normally connected to a sump or drain.

When the coil is energized, the ball 22 is drawn upwardly as viewed in FIG. 1 against the first seat 18 so that fluid can flow from the inlet 34 past the ball 22 and second seat 21 and through the passages 33 to the exterior. Fluid is prevented from flowing out of the opening 17 by seating the ball 22 against the seat 18.

By locating passageways 33 in housing 10 at an acute angle to the axial opening 34, it has been found that the axial opening 34 can be made larger in diameter and there is much less resistance to flow than when the outlet passages are parallel to the axial opening causing a complete reversal of direction of flow.

The flux induced by the coil 29 will follow a path through the center pole 15 into flange 16, through wall section 13 and end face 11, across the air gap between the ball 22 and bore 34, through ball 22, across the air gap between the ball 22 and center pole 15, and into the center pole 15. It should be noted that the seat 21 and, in this case, the entire insert 20 is non-magnetic and thus carries no applicable magnetic flux.

Materials for the flux carrying components are normally low carbon mild steels or sintered irons while the non-magnetic seat material is normally an austenitic stainless steel for durability but could be any non-magnetic material.

Since this is a normally closed valve, in the unenergized state the ball must seal off the inlet pressure through the biasing force of the spring. Generally a "pop off" of "start leak" pressure is specified by the end user of the valve. Calibration for "pop off" pressure is made by applying this pressure to the inlet side of the ball either by actual fluid pressure or by mechanical force and adjusting the spring by pushing the roll pin 26 against the spring until the ball just seals off the inlet. The roll pin is then either welded or mechanically staked in place to maintain the calibration.

A clearance of 0.003" to 0.10" preferably is maintained between the ball 22 and opening 19 to minimize the air gap between them so as to optimize the magnetic circuit to minimize power requirements. Since the clearance is so small, the grooves 23 are necessary to allow the fluid to flow around the ball and out the exhaust port without undue restriction, and to minimize the hydraulic forces acting on the ball. The clearance between ball 22, when it engages one seat, and the other seat ranges between 0.003" and 0.020".

Use of the ball as both a sealing member and as the armature are basically required to obtain the desired performance from the small package size required.

The lead wires from the coil pass through the end flange and are then attached to a standard quick connector that also receives the wires from the microprocessor.

In a pulse width modulated mode, controlled output pressure is obtained through modulation of the "on" to "off" time during each cycle at any given frequency. The valves have been used at operational frequencies of from 30 to 100 hertz but higher or lower frequencies could be used. The operating frequency is normally constant with the amount of "on" time being varied within the cycle to give the proper output pressure. Theoretically, the output pressure would be zero, when the valve is "off", and would be input pressure, when the valve is "on"; however, due to friction, inertia and elasticity in the hydraulic circuit, the output pressure tends to effectively average somewhere between zero and input depending on the ratio of "on" to "off" time.

In typical example, the coil is energized at a frequency of 100 hertz (cycles per second) which allows 10 ms of operation time for each cycle. The outlet pressure is varied by maintaining the duration of the energizing signal within the 10 ms time frame. The longer the signal is applied, the closer the average outlet pressure is to the inlet pressure. Ideally, the ratio of pressure out to pressure in is a straight line function of the ratio of energized time to available cycle time, that is, at an "on" time of 3 ms (or 30% of 10 ms available), the output pressure would be 30% of the input pressure. In actual practice, it takes about approximately 1.6 ms of on time to unseat the ball. This lag is due to the time required to build sufficient magnetic force to overcome the spring force and ball inertia; likewise, it takes approximately 1.5 ms for the ball to return to the normally closed position once the coil current is shut off. This device is able to accurately regulate oil output pressure at 20%-100% of input pressure.

Although the valve shown is particularly designed for use in a pulse width modulated mode, it can also be utilized in an on-off or steady state directional mode.

Referring to FIG. 3, the valve is shown as mounted in a typical tarnsmission manifold 35 having an inlet manifold passage 36 and outlet channel 37, 38 that direct fluid from the valve to clutches or spool valves as the case may be. It can be seen that by providing a plurality of passageways 33 in the housing 10 at an acute angle to axial opening 34, the axial opening 34 can be made larger in diameter than when the outlet passges are formed in the insert 20 and are parallel to the axial opening 34 thereby limiting the diameter of the axial opening as shown, for example, in the solenoid valve shown in copending patent application Ser. No. 577,853, filed Feb. 7, 1984, now abandon, having a common assignee with this application. As a result it is possible to obtain a greater volume of flow at the desired pressure.

See also the U.S. Pat. No. 3,828,818 to Hunt where the inlet passage 17 and the outlet passage 24 are parallel to each other and both formed in the core 10. Bearing in mind that it is important to make the solenoid valve as small as practically possible because of the space limitations in which the valve is used, it follows that where the inlet and outlet passages are in parallel relation, as shown in the above application and patent, the diameters of the passageways are necessarily limited because the diameter of the one passgeway can be increased only at the expense of the other passageway whereas in the present invention where the outlet passages 33 are disposed out of parallelism and are at an acute angle to the inlet passageway 34, the diameter of neither passageway is restricted by the diameter of the other passageway and this permits the usage of passageways having much larger diameters for a given size valve than in the case of the passageways in the above application and patent. This is very important attribute to the instant solenoid valve because it promotes a greater volume of liquid flow and thus enhances the speed at which the mechanism controlled by the instant solenoid valve responds. This feature is particularly important where the solenoid valve is used as part of the control set up for an automatic transmission.

I claim:

1. A normally closed three way solenoid valve comprising
a valve housing including a transverse wall, an extension extending axially from said transverse wall, a peripheral wall extending axially from the periphery of the transverse wall in a direction opposite to the direction in which the axial extension extends, a pole member including a pole piece extending axially inwardly of the housing and having a transverse wall extending radially outwardly into engagement with the peripheral wall and connected thereto, said pole piece having an axial opening therethrough, said pole piece defining a first conical seat, said axial extension of said housing having an axial opening aligned with the opening of said pole, an insert of non-magnetic material positioned in an axial opening in said axial extension and having an axial opening, said insert defining a second seat and having an axial opening, a ball interposed between the first and second seat and having limited movement between said seats, said axial opening in said pole piece having a narrow portion adjacent the first seat, spring means comprising a spring positioned in said axial opening in said pole piece and having a projection yieldingly urged by said spring through said narrow portion of the axial opening and said first seat to yieldingly urge said ball into engagement with the second seat, said housing and pole member defining an annular space, a coil assembly in said annular space, a plurality of circumferentially spaced passages in said housing spaced from said insert extending from adjacent the periphery of the ball through the axial extension of the housing at an acute angle to the axial opening in the axial extension to the periphery of the housing, such that when fluid is applied to the axial opening in said insert and the coil is de-energized, said spring means holds the ball against the second seat and prevents flow through said axial opening in said insert while permitting communication between the angular passages about the ball and first seat through the axial opening in the pole, and when the solenoid is energized the ball is drawn toward the first seat to close communication to the axial opening in the pole and permit flow from the axial opening in the insert past the second seat and through the circumferentially spaced passages by the insert to the exterior of the axial extension.

2. The solenoid valve set forth in claim 1 wherein said valve includes spaced annular seals on the exterior of said axial entension and the outer ends of said circumferentially spaced passages terminate at points axially between said seals.

3. The solenoid valve set forth in claim 1 including a manifold having an inlet manifold passage and an outlet channel, said axial extension of said valve extending into said manifold such that the intake manifold passage communicates with said axial opening in said axial extension and said outlet channel communicates with said circumferentially spaced passages.

4. The solenoid valve set forth in claim 1 including a manifold having an inlet manifold passage and an outlet channel, said valve extending into said manifold such that the intake manifold passage communicates with said axial opening and said outlet channel communicates with said circumferentially spaced passages.

5. A normally closed three way solenoid valve comprising a valve housing including a transverse wall, a pole member including a pole piece extending axially inwardly of the housing, said pole piece having an axial opening therethrough, said pole piece defining a first conical seat, said transverse wall of said housing having an axial opening aligned with the opening of said pole piece, an insert of non-magnetic material positioned in the axial opening of said transverse wall and having an axial opening, said insert defining a second seat, a ball interposed between the first and second seats and having limited movement between said seats, said axial opening in said pole piece having a narrow portion adjacent the first seat, spring means comprising a spring positioned in said axial opening in said pole piece and having a projection yieldingly urged by said spring through said narrow portion of the axial opening and said first seat to yieldingly urge said ball into engagement with the second seat, a coil assembly in said housing, a plurality of circumferentially spaced passages in said housing spaced from said insert and extending from adjacent the periphery of the ball through the housing at an acute angle to the axial opening in the axial extension to the periphery of the housing, such that when fluid is applied to the axial opening in said insert and the coil is de-energized, said spring means holds the ball against the second seat and prevents flow through said axial opening in said insert while permitting communication between the angular passages about the ball and first seat through the axial opening in the pole piece, and when the solenoid is energized, the ball is drawn toward the first seat to close communication to the axial opening in the pole piece and permit flow from the axial opening in the insert past the second seat and through the circumferentially spaced passages by the insert to the exterior of the axial extension.

6. The solenoid valve set forth in claim 5 wherein said valve includes spaced annular seals on the exterior of said axial extension and the outer ends of said circumferentially spaced passages terminate at points axially between said seals.

* * * * *

UNITED STATES PATENT AND TRADEMARK OFFICE
CERTIFICATE OF CORRECTION

PATENT NO. : 4,570,904
DATED : February 18, 1986
INVENTOR(S) : Charles J. Mullally It is certified that error appears in the above-identified patent and that said Letters Patent are hereby corrected as shown below:

Column 2, line 35, delete "prinning" and insert --pinning--
Column 3, line 38, delete "0.10" and insert --.010--
Column 4, line 01, after "In" insert --a--
Column 4, line 31, delete "passges" and insert --passages--

Signed and Sealed this

Eighth Day of July 1986

[SEAL]

Attest:

Attesting Officer

DONALD J. QUIGG

Commissioner of Patents and Trademarks